US008143758B2

(12) United States Patent
Kimura et al.

(10) Patent No.: US 8,143,758 B2
(45) Date of Patent: Mar. 27, 2012

(54) WINDING BOBBIN AND ROTATING ELECTRIC MACHINE

(75) Inventors: Takahiro Kimura, Chiyoda-ku (JP);
Kazunori Tanaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 211 days.

(21) Appl. No.: 12/611,521

(22) Filed: Nov. 3, 2009

(65) Prior Publication Data

US 2011/0018375 A1 Jan. 27, 2011

(30) Foreign Application Priority Data

Jul. 23, 2009 (JP) ................................. 2009-171804

(51) Int. Cl.
*H02K 3/51* (2006.01)
*H01F 5/04* (2006.01)
*H01F 27/28* (2006.01)
(52) U.S. Cl. ......... 310/194; 310/180; 310/263; 336/192
(58) Field of Classification Search .................... 310/71, 310/180, 194–195, 263; 336/192, 198
See application file for complete search history.

(56) References Cited

U.S. PATENT DOCUMENTS

| 5,574,324 | A | * | 11/1996 | Hirama et al. ................. 310/194 |
| 5,886,451 | A | * | 3/1999 | Hatsios et al. ................. 310/263 |
| 5,898,252 | A | * | 4/1999 | Tanaka et al. ................. 310/214 |
| 6,037,694 | A | * | 3/2000 | Asao et al. ............. 310/216.116 |
| 6,107,719 | A | * | 8/2000 | Asao ............................. 310/194 |
| 6,114,786 | A | * | 9/2000 | Ishida et al. .................... 310/71 |
| 6,172,434 | B1 | * | 1/2001 | Oohashi et al. ................. 310/71 |
| 6,501,207 | B2 | * | 12/2002 | Oohashi et al. ............... 310/263 |
| 6,621,190 | B1 | * | 9/2003 | Asao et al. ..................... 310/263 |
| 6,777,845 | B2 | * | 8/2004 | York et al. ..................... 310/194 |
| 6,784,577 | B2 | * | 8/2004 | Kondo ............................. 310/71 |
| 6,847,138 | B2 | * | 1/2005 | York et al. ....................... 310/71 |
| 7,053,515 | B2 | * | 5/2006 | Nakanishi et al. ............ 310/194 |
| 7,608,973 | B2 | * | 10/2009 | Maeda et al. .................. 310/263 |
| 7,956,507 | B2 | * | 6/2011 | Tokizawa ...................... 310/194 |
| 2005/0218744 | A1 | | 10/2005 | Nakanishi et al. |
| 2007/0267935 | A1 | * | 11/2007 | York et al. ..................... 310/263 |

FOREIGN PATENT DOCUMENTS

| DE | 19506162 A1 | 9/1995 |
| JP | 6-72226 U | 10/1994 |
| JP | 8-316058 A | 11/1996 |
| JP | 2002-223551 * | 8/2002 |
| JP | 2005-057131 A | 3/2005 |
| JP | 2007-312487 A | 11/2007 |

OTHER PUBLICATIONS

German Office Action corresponding to German Patent Application No. 10 2009 052 940.3-32 dated Feb. 2, 2010.

* cited by examiner

*Primary Examiner* — Burton Mullins
(74) *Attorney, Agent, or Firm* — Sughrue Mion, PLLC

(57) ABSTRACT

Provided is a winding bobbin with a simple structure, which allows, even when a number of layers formed by winding a conductor is odd, a winding start-side lead wire and a winding end-side lead wire to be led out in the same direction while ensuring a desired outer diameter size of a rotor coil without loosening a tightly wound conductor. The winding bobbin (50) includes a first flange portion (51) and a second flange portion (52) on both sides of a cylindrical winding portion (49). The second flange portion (52) is provided with a second locking portion (58) for locking a winding end portion (45) of the conductor which is wound around the winding portion (49) in an odd number of layers.

6 Claims, 8 Drawing Sheets

PRIOR ART

PRIOR ART

PRIOR ART

PRIOR ART

PRIOR ART

FIG. 11

WINDING BOBBIN AND ROTATING ELECTRIC MACHINE

BACKGROUND OF THE INVENTION

1. Field of the Invention

The present invention relates to a winding bobbin around which a conductor is wound in several layers and a rotating electric machine using the winding bobbin.

2. Description of the Related Art

As a conventional winding bobbin, the following winding bobbin is known. The winding bobbin includes: a winding portion around which a conductor is wound; and a first flange portion and a second flange portion respectively provided on both sides of the winding portion. A groove having a depth equal to an outer diameter size of the conductor is formed in the winding portion between the first flange portion and the second flange portion (for example, see JP 08-316058 A (FIG. 1)).

In the case of the above-mentioned conventional winding bobbin, the conductor is wound around the winding portion from the first flange portion toward the second flange portion. When the conductor is wound to reach the second flange portion, the conductor is then wound back from the second flange portion toward the first flange portion. When the number of layers formed by winding the conductor is even, a winding-start side lead wire of the conductor and a winding-end side lead wire of the conductor are led out in the same direction.

If it is desired to lead out the winding-start side lead wire and the winding-end side lead wire in the same direction even in the case where the number of layers formed by winding the conductor is odd, the groove is formed in the winding portion to prevent the effort of winding back the conductor in another extra layer to fabricate a rotor coil with an increased outer diameter size or to prevent the number of layers formed by winding the conductor from being reduced by one to fabricate a rotor coil with a reduced outer diameter size.

More specifically, in this case, a winding start portion of the conductor is caused to pass along the groove to the second flange portion, thereby allowing the winding of the conductor to be started at the second flange portion. As a result, even when the number of layers formed by winding the conductor is odd, the winding-start side lead wire and the winding-end side lead wire can be led out in the same direction while a desired outer diameter size of the rotor coil is ensured.

For the conventional winding bobbin, however, it is necessary to additionally form the groove having the depth equal to the outer diameter size of the conductor between the first flange portion and the second flange portion. Therefore, there is a problem that the fabrication of the winding bobbin becomes complicated.

SUMMARY OF THE INVENTION

The present invention has been made to solve the problem described above, and has an object of providing a winding bobbin with a simple structure, which allows a winding start-side lead wire and a winding end-side lead wire to be led out in the same direction while ensuring a desired outer diameter size of a rotor coil without loosening a tightly wound conductor even when the number of layers formed by winding the conductor is odd.

The present invention has another object of providing a rotating electric machine, in which the winding start-side lead wire and the winding end-side lead wire led out in the same direction are easily electrically connected to a slip ring, while ensuring the desired outer diameter size of the rotor coil without loosening the tightly wound conductor even when the number of layers formed by winding the conductor is odd.

A winding bobbin according to the present invention includes: a winding portion around which a conductor is wound to form a rotor coil; and a first flange portion and a second flange portion respectively provided on both sides of the winding portion, in which: a first locking portion and a second locking portion, each being for locking the conductor, are respectively provided to the first flange portion and the second flange portion; the first locking portion provided to the first flange portion is in a pair, and a winding start portion of the conductor is locked to one of the first locking portions, whereas a winding end portion of the conductor is locked to another one of the first locking portions; the winding end portion of the conductor wound around the winding portion in an odd number of layers is locked to the second locking portion provided to the second flange portion; and a winding start-side lead wire connected to the winding start portion of the conductor and a winding end-side lead wire connected to the winding end portion of the conductor are led out from the first flange portion.

A rotating electric machine according to the present invention includes: a shaft rotatably provided inside a case; a Lundell rotor fixed to the shaft, the Lundell rotor having North-seeking (N) poles and South-seeking (S) poles alternately formed along a direction of rotation; a slip ring fixed to an end portion of the shaft; and a stator surrounding the rotor; in which the rotor includes: the rotor coil including the winding bobbin according to claim 1 or 2 and the conductor wound around the winding bobbin, the rotor coil generating a magnetic flux upon supply of a current through the slip ring electrically connected to the winding start-side lead wire and the winding end-side lead wire; and a first pole core body and a second pole core body covering the rotor coil, the first pole core body and the second pole core body including a plurality of claw-shaped magnetic poles magnetized to the North-seeking (N) poles and the South-seeking (S) poles by the magnetic flux, the plurality of claw-shaped magnetic poles being arranged to be opposed to each other in an intermeshing manner; and the winding end portion of the conductor is locked to the second locking portion and the another one of the first locking portions.

According to the winding bobbin of the present invention, the second locking portion for locking the winding end portion of the conductor which is wound around the winding portion in the odd number of layers is provided to the second flange portion. Therefore, even when the number of layers formed by winding the conductor is odd, the winding bobbin with a simple structure allows the winding start-side lead wire and the winding end-side lead wire to be led out in the same direction while ensuring the desired outer diameter size of the rotor coil without loosening the tightly wound conductor.

Further, according to the rotating electric machine of the present invention, the second locking portion for locking the winding end portion of the conductor which is wound around the winding portion in the odd number of layers is provided to the second flange portion. Therefore, even when the number of layers formed by winding the conductor is odd, the rotating electric machine with a simple structure can easily electrically connect the winding start-side lead wire and the winding end-side lead wire, which are led out in the same direction, to the slip ring while ensuring the desired outer diameter size of the rotor coil without loosening the tightly wound conductor.

DETAILED DESCRIPTION OF THE PREFERRED EMBODIMENT

Preferred embodiments of the present invention will now be explained based on the drawings, and identical or corresponding members and portions in the drawings will be given identical numbering.

Embodiment 1

Figure 1:
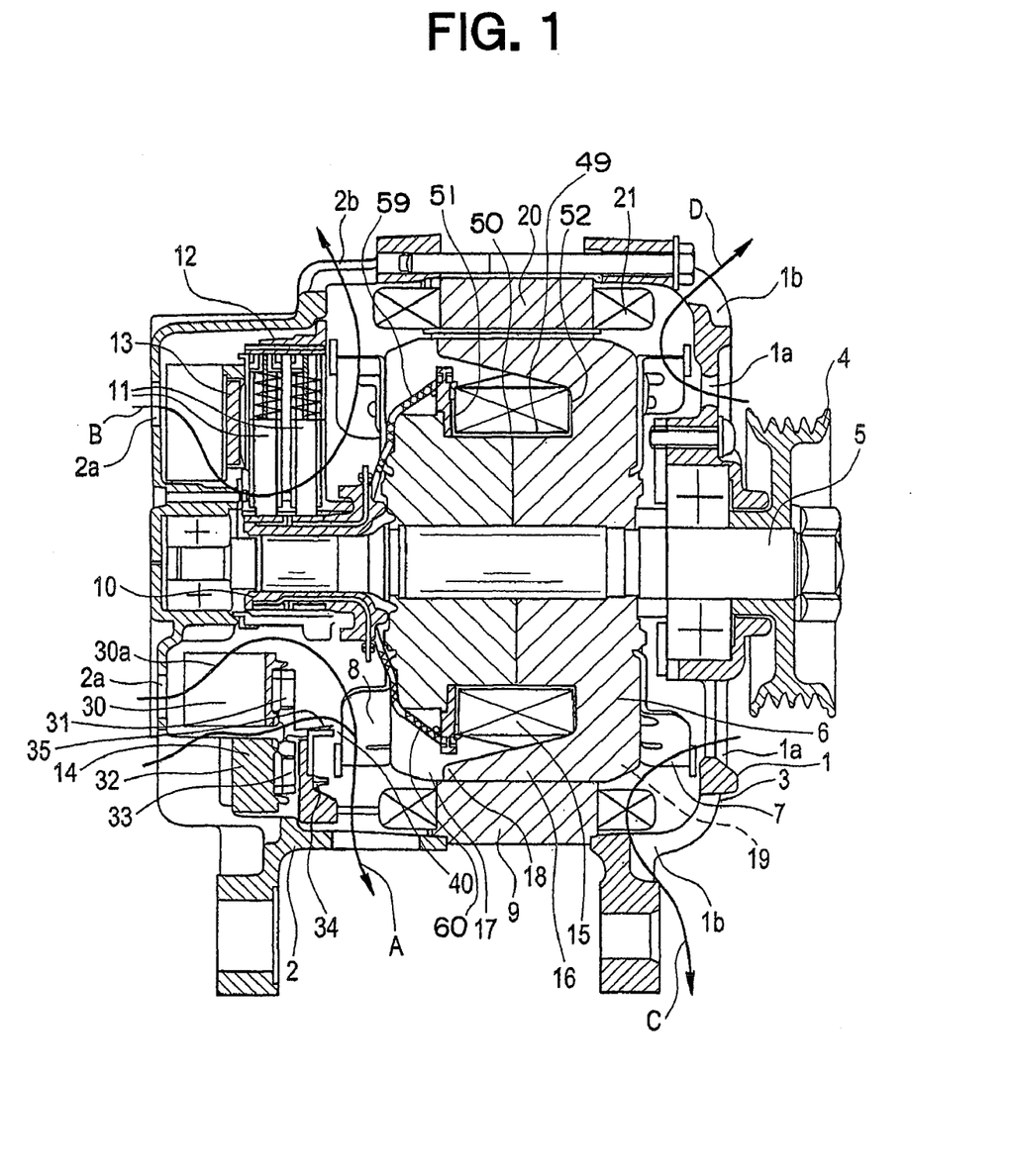
FIG. 1 is a side sectional view illustrating an automotive alternator according to Embodiment 1 of the present invention.

FIG. 1 is a cross section of an automotive alternator (hereinafter simply "alternator") according to Embodiment 1 of the present invention.

In an alternator, a shaft 5 that has a pulley 4 fixed to a first end portion is rotatably disposed inside a case 3 that is constituted by a front bracket 1 and a rear bracket 2 that are made of aluminum. A Lundell rotor 6 is fixed to the shaft 5. A stator 9 is fixed to an inner wall surface of the case 3 around the rotor 6 so as to surround the rotor 6.

Slip rings 10 that supply electric current to the rotor 6 are fixed to a second end portion of the shaft 5. A pair of brushes 11 that are housed inside a brush holder 12 slide in contact with surfaces of the slip rings 10.

A voltage regulator 13 that adjusts magnitude of alternating voltage generated in the stator 9 is fixed to the brush holder 12. Rectifiers 14 that are electrically connected to the stator 9 so as to rectify alternating current into direct current are also disposed inside the rear bracket 2.

A plurality of front-end suction apertures 1a are formed on a radially-inner side of the front bracket 1 and a plurality of front-end discharge apertures 1b are formed on a radially-outer side. A plurality of rear-end suction apertures 2a are formed on a radially-inner side of the rear bracket 2 and a plurality of rear-end discharge apertures 2b are formed on a radially-outer side.

The above rotor 6 includes: a winding bobbin 50; a rotor coil 15 where a conductor, which is an enamel copper wire, is wound around the winding bobbin 50 in several layers, to generate magnetic flux on passage of an electric current; a pole core that is disposed so as to cover the rotor coil 15; a front-end fan 7 that is fixed to an end surface of the pole core near the pulley 4; and a rear-end fan 8 that is fixed to an end surface on an opposite side of the pole core from the pulley 4. The pole core includes a front-end pole core body 16 and a rear-end pole core body 17 that are magnetized into North-seeking (N) poles and South-seeking (S) poles by the magnetic flux. The front-end pole core body 16 and the rear-end pole core body 17 have front-end claw-shaped magnetic poles 18 and rear-end claw-shaped magnetic poles 19, respectively, that are claw-shaped and intermesh with each other.

The above stator 9 includes: a stator core 20 through which a rotating magnetic field from the rotor 6 passes; and a stator coil 21 that is disposed radially inside the stator core 20. A plurality of slots that are formed so as to extend axially are disposed at a uniform pitch around an entire circumference radially inside the stator core 20, which is configured by laminating steel sheets.

The stator coil 21 is constituted by two three-phase alternating-current windings in each of which three winding portions are three-phase Y-connected, and the two three-phase alternating-current windings have a phase difference from each other.

The above rectifiers 14 include: a horseshoe-shaped aluminum first heat sink 30; rectangular parallelepipedic first unidirectional conducting element bodies 31 that are disposed on a front surface of the first heat sink 30 so as to be spaced apart circumferentially; a horseshoe-shaped aluminum second heat sink 32 that is disposed radially outside the first heat sink 30; rectangular parallelepipedic second unidirectional conducting element bodies 33 that are disposed on the second heat sink 32 so as to be spaced apart circumferentially; and a horseshoe-shaped circuit board 34 that is disposed so as to cover the second unidirectional conducting element bodies 33.

A plurality of radiating fins 30a are formed in a radial pattern on a rear surface of the aluminum first heat sink 30. The first unidirectional conducting element bodies 31 are formed by insertion molding diodes using an insulating resin.

A portion of a rear surface of the aluminum second heat sink 32 is placed in surface contact with the rear bracket 2. The second unidirectional conducting element bodies 33 are formed by insertion molding diodes using an insulating resin.

The circuit board 34 is formed by insertion molding a plurality of circuit board terminals 35. The first unidirectional conducting element bodies 31 and the second unidirectional conducting element bodies 33 are connected by the circuit board terminals 35 so as to constitute a bridge circuit. The stator coil 21 and the rectifiers 14 are also connected by the circuit board terminals 35.

Figure 2:
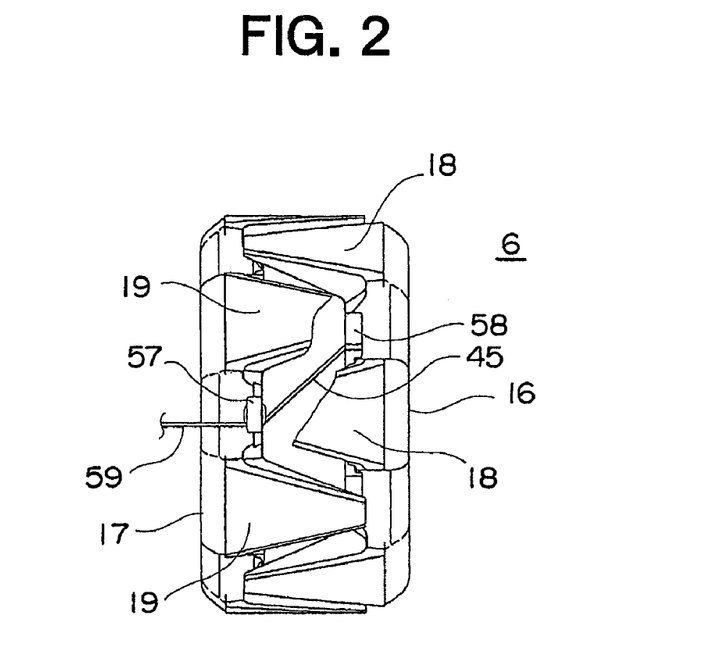
FIG. 2 is a side view illustrating a rotor illustrated in FIG. 1.
Figure 3:
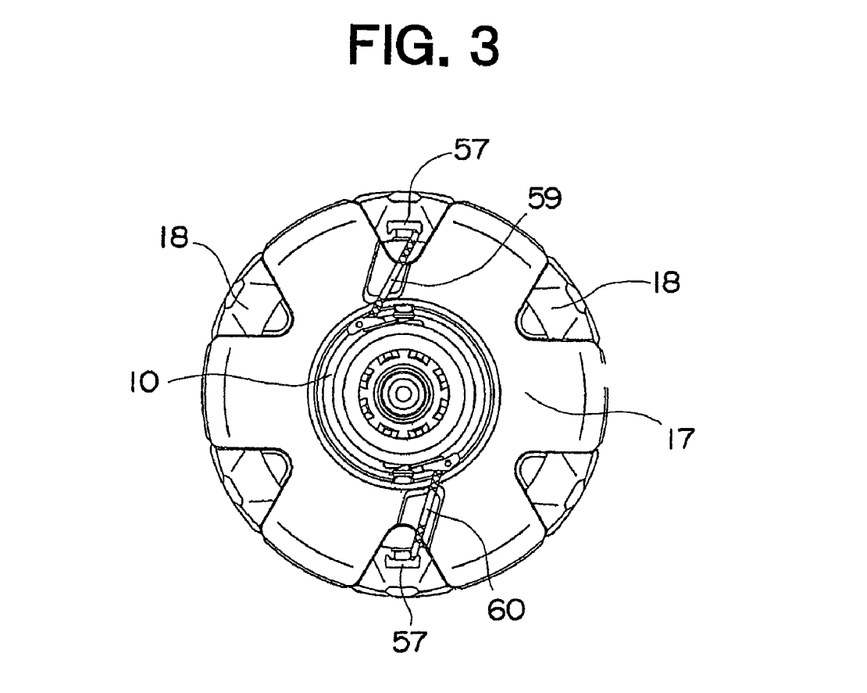
FIG. 3 is a front view illustrating the rotor illustrated in FIG. 1.
Figure 4:
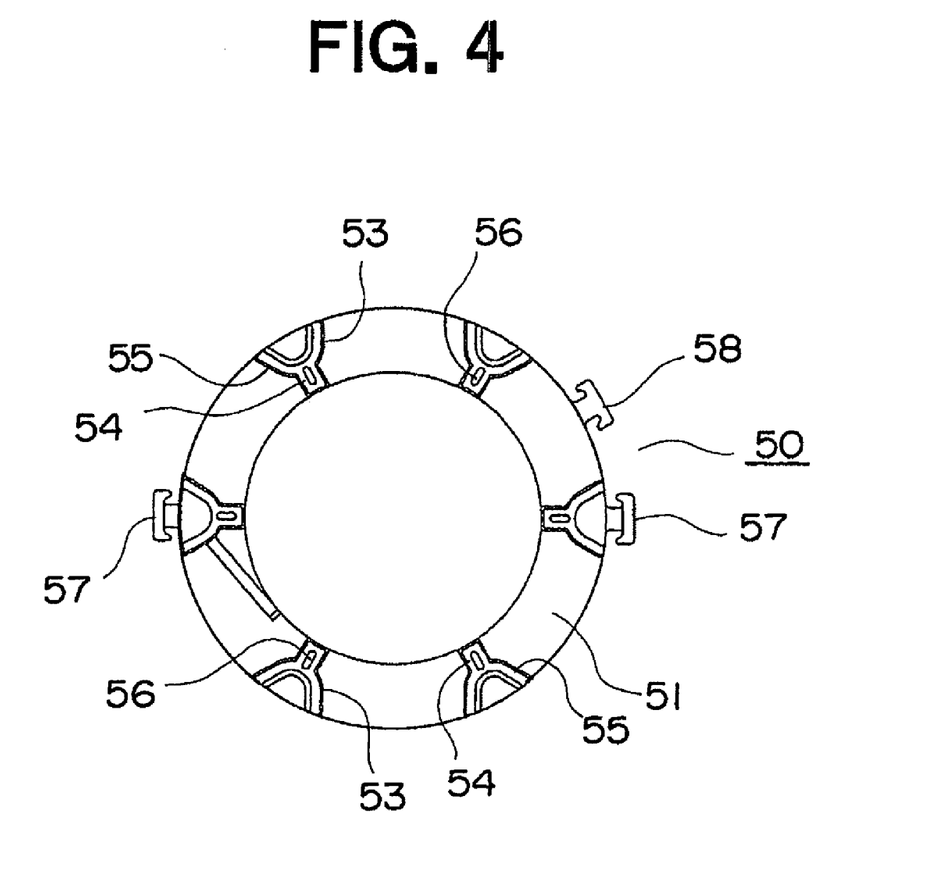
FIG. 4 is a front view illustrating a bobbin illustrated in FIG. 1.

FIG. 2 is a side view of the rotor 6 illustrated in FIG. 1, FIG. 3 is a front view of the rotor 6 illustrated in FIG. 1, and FIG. 4 is a front view of the winding bobbin 50 illustrated in FIG. 1.

The winding bobbin 50 includes: a cylindrical winding portion 49; a first flange portion 51 formed on the side of the winding portion 49, which is near the slip rings 10; and a second flange portion 52 formed on the side of the winding portion 49, which is opposite to the slip rings 10. Rotation stopping portions 53, each projecting axially, are formed at a uniform pitch along a circumferential direction on each of the first flange portion 51 and the second flange portion 52. Each of the rotation stopping portions 53 includes: a fitting portion 54; and a rotation stopping main body 55 having a larger thickness than that of the fitting portion 54. The fitting portions 54 are fitted to a base portion of the front-end pole core body 16 between the front-end claw-shaped magnetic poles 18 and a base portion of the rear-end pole core body 17 between the rear-end claw-shaped magnetic poles 19. The rotation stopping main bodies 55 are respectively positioned between proximal end portions of the adjacent front-end claw-shaped magnetic poles 18 and between proximal end portions of the adjacent rear-end claw-shaped magnetic poles 19. A concave portion 56 is formed in each of the fitting portions 54. The concave portion 56 is filled with an adhesive which is hardened.

Figure 5:
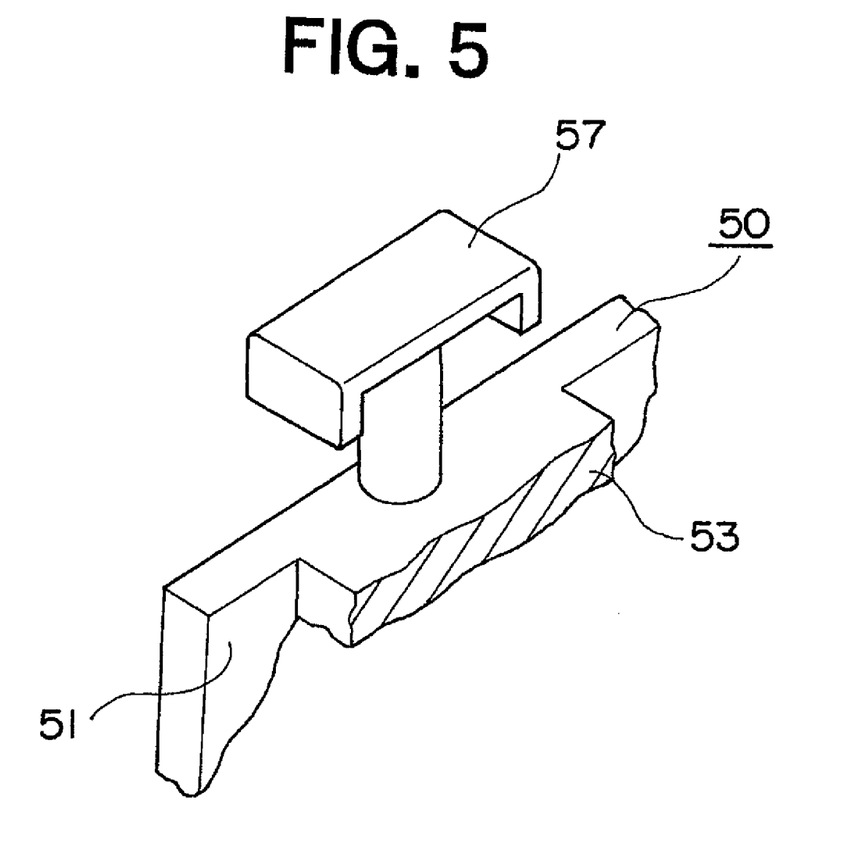
FIG. 5 is a perspective view illustrating a first locking portion illustrated in FIG. 4.

The first flange portion 51 includes first locking portions 57 illustrated in FIG. 5, each extending radially. The first locking portions 57 are respectively provided to a pair of the rotation stopping portions 53 which are opposed to each other. The second flange portion 52 also includes a second locking portion 58 having the same shape as that of each of the first locking portions 57. The second locking portion 58 is provided to one of the rotation stopping portions 53.

In an automotive alternator having the above configuration, electric current is supplied from the battery (not shown) through the brushes 11 and the slip rings 10 to the rotor coil 15, generating magnetic flux and giving rise to North-seeking (N) poles and South-seeking (S) poles in the front-end and rear-end claw-shaped magnetic poles 18 and 19, respectively.

At the same time, since the pulley 4 is driven by an engine and the rotor 6 is rotated by the shaft 5, a rotating magnetic field is applied to the stator core 20, giving rise to electromotive force in the stator coil 21.

Magnitude of the alternating-current electromotive force is adjusted by the voltage regulator 13, which adjusts current flowing to the rotor 6. Alternating current that is generated by the alternating-current electromotive force also passes through the rectifiers 14 and is rectified into direct current, and the battery is charged.

Due to rotation of the rear-end fan 8 that is fixed to the end surface of the rotor 6, external air is drawn in near the rear bracket 2 through the rear-end suction apertures 2a, and as indicated by arrow A in FIG. 1, cools the rectifiers 14, then cools terminal connection portions 40 and coil ends of the stator coil 21, and is then discharged externally through the rear-end discharge apertures 2b. As indicated by arrow B in FIG. 1, external air also cools the voltage regulator 13, then cools the stator coil 21, and is then discharged externally through the rear-end discharge apertures 2b.

As indicated by arrows C and D in FIG. 1, near the front bracket 1, external air is also drawn in through the front-end suction apertures 1a, is deflected centrifugally by the front-end fan 7, cools coil ends of the stator coil 21, and is discharged externally through the front-end discharge apertures 1b.

In this embodiment, when the conductor is to be wound around the winding bobbin 50 in several layers, after the conductor is first locked to one of the first locking portions 57 of the first flange portion 51, the conductor is wound around the winding portion 49 from the first flange portion 51 toward the second flange portion 52. When the conductor is wound to reach the second flange portion 52, the conductor is then wound back from the second flange portion 52 toward the first flange portion 51.

The above-mentioned winding operation is sequentially repeated. When the conductor is wound in an even number of layers, a winding end portion 45 is finally locked to the other first locking portion 57 of the first flange portion 51. A winding end-side lead wire 59 connected to the winding end portion 45 is led out in the same direction as that in which a winding start-side lead wire 60 of the conductor is led out. In this manner, each of the winding start-side lead wire 60 and the winding end-side lead wire 59 is electrically connected to the slip rings 10.

Figure 6:
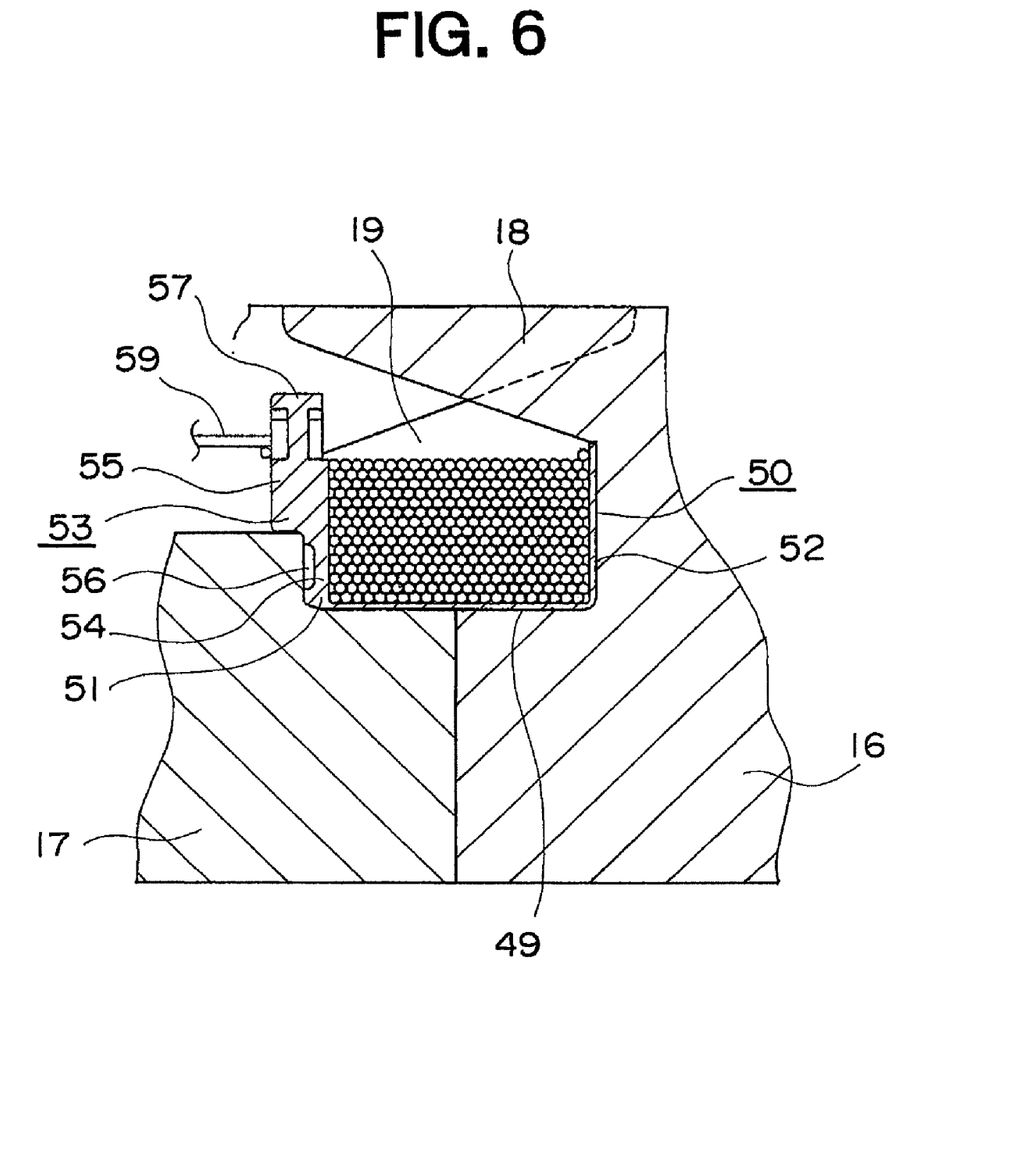
FIG. 6 is a side sectional view illustrating a principal part of the rotor illustrated in FIG. 1.

When the final layer formed by winding the conductor is an odd-numbered one, the winding of the conductor is terminated on the side of the second flange portion 52 as illustrated in FIG. 6. The winding end portion 45 of the conductor is subsequently locked to the second locking portion 58 of the second flange portion 52. Then, as illustrated in FIG. 2, the winding end portion 45 is caused to pass through a space portion between the front-end claw-shaped magnetic pole 18 and the rear-end claw-shaped magnetic pole 19 adjacent to the front-end claw-shaped magnetic pole 18 to be locked to the other first locking portion 57 of the first flange portion 51. The winding end-side lead wire 59 connected to the winding end portion 45 is led out to the side of the slip rings 10, as in the case of the winding start-side lead wire 60. In this manner, each of the winding start-side lead wire 60 and the winding end-side lead wire 59 is electrically connected to the slip rings 10.

Figure 7:
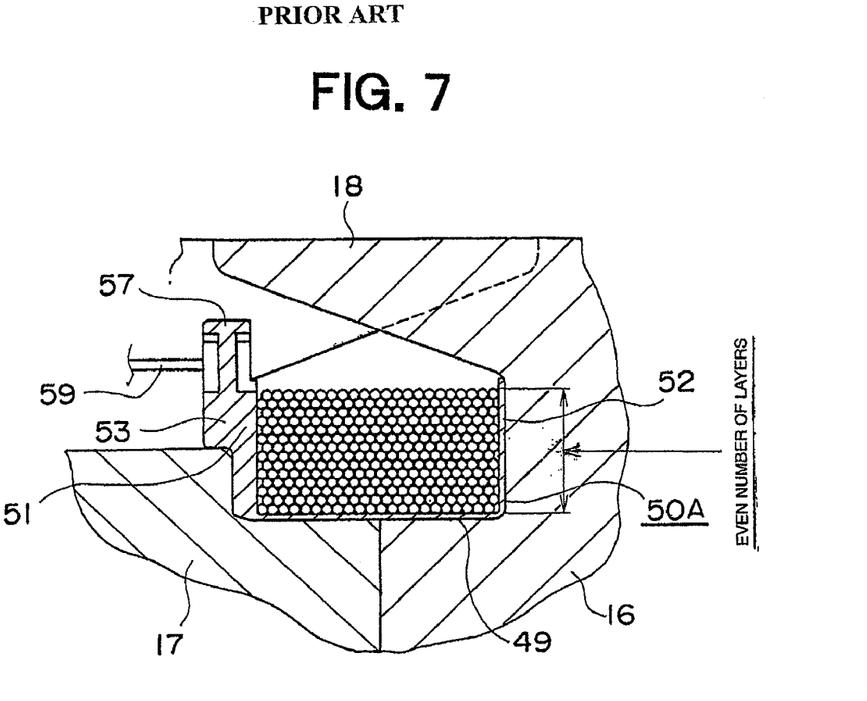
FIG. 7 is a side sectional view of a principal part, illustrating an example of a conventional rotor.

FIG. 7 is a sectional view of a principal part of the rotor, illustrating the case where the conductor is wound around a conventional winding bobbin 50A in an even number of layers, specifically, in the case where the second flange portion 52 is not provided with the second locking portion 58.

Figure 8:
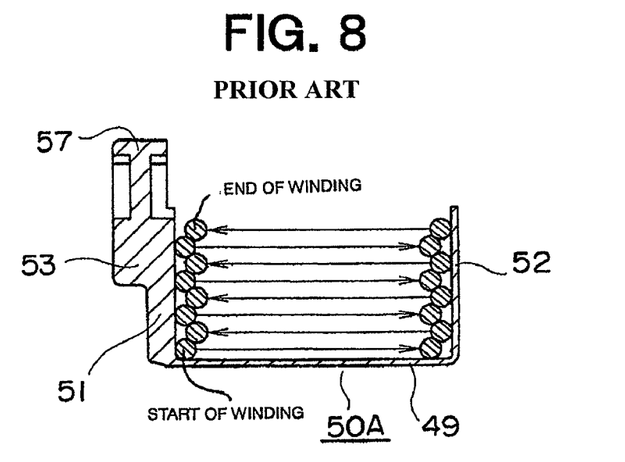
FIG. 8 is an explanatory view illustrating a state where a conductor is wound in FIG. 7.

In this example, the conductor is wound around the winding bobbin 50A in an even number of layers, which is smaller by one than a desired number of layers formed by winding the conductor. As illustrated in FIG. 8, the winding of the conductor are started and terminated on the same side, that is, on the side of the first flange portion 51.

Therefore, the winding start-side lead wire 60 and the winding end-side lead wire 59 are led out to the side near the slip rings 10. Thus, each of the lead wires 60 and 59 is easily connected to the slip rings 10.

In the case of the conventional winding bobbin 50A, however, although there is a space which allows the conductor to be wound in another layer between the claw-shaped magnetic poles 18 and 19 and an outer circumferential surface of the rotor coil 15, the number of layers of the conductor is reduced by one because the lead wires 60 and 59 are required to be led out to the side near the slip rings 10.

The reduction of the number of layers formed by winding the conductor lowers an electric resistance value of the rotor coil 15. A field current becomes correspondingly excessively high for the rotor coil 15. As a result, a value of increase in temperature of the rotor coil becomes disadvantageously large.

Figure 9:
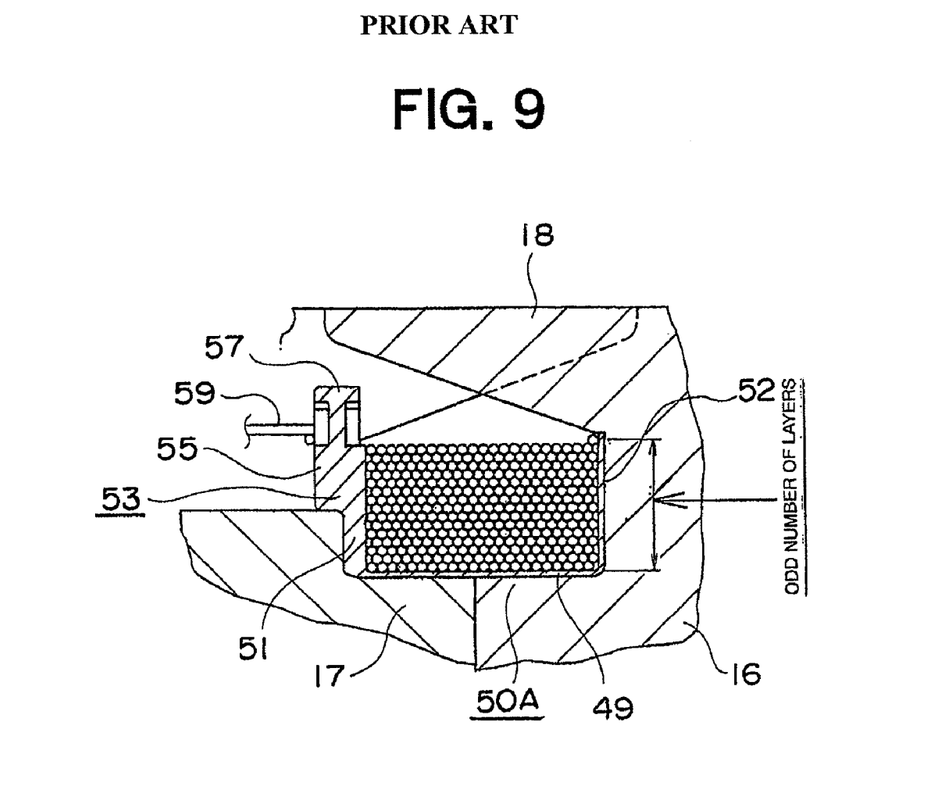
FIG. 9 is a side sectional view of a principal part, illustrating another example of the conventional rotor.
Figure 10:
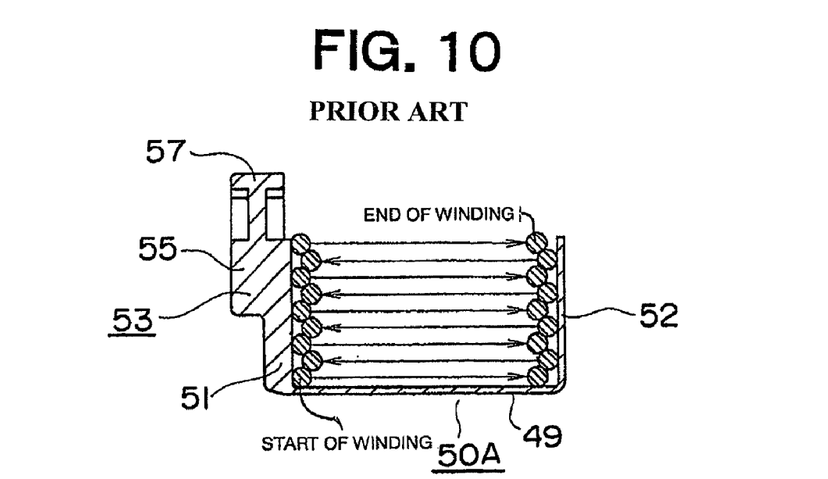
FIG. 10 is an explanatory view illustrating a state where a conductor is wound in FIG. 9.

On the other hand, FIG. 9 illustrates the case where the number of layers formed by winding the conductor is increased by one, therefore, the conductor is wound around the winding bobbin 50A in a desired odd number of layers. In this case, as illustrated in FIG. 10, the winding of the conductor is started on the side of the first flange portion 51, whereas the winding of the conductor is terminated on the side of the second flange portion 52.

Figure 11:
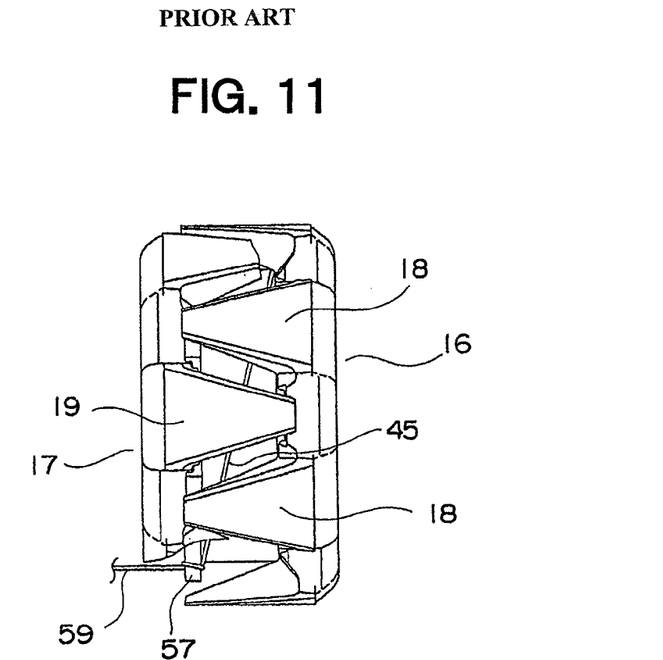
FIG. 11 is a side view illustrating a rotor of a conventional automotive alternator.

In the case of this winding bobbin 50A, in contrast to Embodiment 1, after the winding of the conductor in the odd number of layers is completed, the winding end portion 45 of the conductor is not locked to the second locking portion 58. Instead, the winding end portion 45 of the conductor is required to pass under radially inner surfaces of the plurality of claw-shaped magnetic poles 18 and 19, as illustrated in FIG. 11.

Thus, there is a risk as follows, for example. The winding end portion 45 and the conductor in the outermost layer are affected by vibrations of the rotor 6 or the like to be biased toward the first flange portion 51. As a result, the tightly wound conductor may be loosened to collide against the plurality of claw-shaped magnetic poles 18 and 19, which in turn breaks the conductor.

As described above, according to the automotive alternator of this embodiment, the winding bobbin 50 is provided with the second locking portion 58 for locking the winding end portion 45 of the conductor which is wound around the winding portion 49 in the odd number of layers.

Therefore, even when the number of layers formed by winding the conductor is odd, the winding bobbin 50 with a simple structure allows the winding start-side lead wire 60 and the winding end-side lead wire 59 to be led out in the same direction to be easily connected to the slip rings 10 adjacent to the rotor 6 while ensuring the desired outer diameter size of the rotor coil without loosening the tightly wound conductor.

Moreover, there is no risk that the winding end portion 45 and the conductor in the outermost layer might collide against the plurality of claw-shaped magnetic poles 18 and 19 to break the conductor.

Moreover, the winding end portion 45 passes between the claw-shaped magnetic poles 18 and 19 which are adjacent to each other. Therefore, the interference of the winding end portion 45 with the claw-shaped magnetic poles 18 and 19 is correspondingly reduced.

Moreover, the first flange portion 51 includes the fitting portions 54, each including the concave portion 56 filled with the adhesive which is hardened, in the base portion of the rear-end pole core body 17 between the adjacent rear-end claw-shaped magnetic poles 19. Further, the second flange portion 52 includes the fitting portions 54, each including the concave portion 56 filled with the adhesive which is hardened, in the base portion of the front-end Dole core body 16 between the adjacent front-end claw-shaped magnetic poles 18. Therefore, the winding bobbin 50 is firmly connected to the rear-end pole core body 17 and the front-end pole core body 16.

Although only one second locking portion 58 is provided to the second flange portion 52 in this embodiment, the second locking portions 58 may be provided at a plurality of positions of the second flange portion 52. In this case, the winding end portion 45 is locked to the nearest second locking portion.

Further, even when the winding end portion 45 passes across the claw-shaped magnetic poles 18 and 19, the desired outer diameter size of the rotor coil 15 is ensured without loosening the tightly wound conductor.

It is apparent that the winding bobbin is applicable not only to the automotive alternator but also to, for example, an electric motor.

What is claimed is:

1. A winding bobbin, comprising:
   a winding portion around which a conductor is wound to form a rotor coil; and
   a first flange portion and a second flange portion respectively provided on both sides of the winding portion, wherein:
   a first locking portion and a second locking portion, each being for locking the conductor, are respectively provided to the first flange portion and the second flange portion;
   the first locking portion provided to the first flange portion is in a pair, and a winding start portion of the conductor is locked to one of the first locking portions, whereas a winding end portion of the conductor is locked to another one of the first locking portions;
   the winding end portion of the conductor wound around the winding portion in an odd number of layers is locked to the second locking portion provided to the second flange portion; and
   a winding start-side lead wire connected to the winding start portion of the conductor and a winding end-side lead wire connected to the winding end portion of the conductor are led out from the first flange portion.

2. The winding bobbin according to claim 1, wherein a plurality of the second locking portions are provided to the second flange portion.

3. A rotating electric machine, comprising:
   a shaft rotatably provided inside a case;
   a Lundell rotor fixed to the shaft, the Lundell rotor having North-seeking poles and South-seeking poles alternately formed along a direction of rotation;
   a slip ring fixed to an end portion of the shaft; and
   a stator surrounding the rotor; wherein
   the rotor includes: the rotor coil including the winding bobbin according to claim 1 and the conductor wound around the winding bobbin, the rotor coil generating a magnetic flux upon supply of a current through the slip ring electrically connected to the winding start-side lead wire and the winding end-side lead wire; and a first pole core body and a second pole core body covering the rotor coil, the first pole core body and the second pole core body including a plurality of claw-shaped magnetic poles magnetized to the North-seeking poles and the South-seeking poles by the magnetic flux, the plurality of claw-shaped magnetic poles being arranged to be opposed to each other in an intermeshing manner; and
   the winding end portion of the conductor is locked to the second locking portion and the another one of the first locking portions.

4. The rotating electric machine according to claim 3, wherein the winding end portion passes between adjacent ones of the claw-shaped magnetic poles.

5. The rotating electric machine according to claim 3, wherein each of the first flange portion and the second flange portion includes a fitting portion having a concave portion filled with an adhesive being hardened, in a base portion of the first pole core body between the adjacent claw-shaped magnetic poles.

6. The rotating electric machine according to claim 3, wherein the rotating electric machine is an automotive alternator.

* * * * *